United States Patent [19]
Premo et al.

[11] Patent Number: 4,632,312
[45] Date of Patent: Dec. 30, 1986

[54] IMPACT DRIVE SPRINKLER

[75] Inventors: Kenneth W. Premo, Fullerton; Billy J. Hobbs, Jr., Upland, both of Calif.

[73] Assignee: Rain Bird Consumer Products Mfg. Corp., Duarte, Calif.

[21] Appl. No.: 681,566

[22] Filed: Dec. 14, 1984

[51] Int. Cl.⁴ .......................... B05B 3/02; B05B 3/08; F16B 7/10; F16H 21/18

[52] U.S. Cl. .................................. 239/230; 239/232; 239/231; 239/264; 403/109; 403/165; 403/360; 74/45; 74/526; 74/531; 185/45

[58] Field of Search ............... 239/230, 231, 232, 233, 239/264; 74/2, 526, 531, 575; 185/45; 403/109, 165, 360, 375, 377, 378

[56] References Cited

U.S. PATENT DOCUMENTS

| | | | |
|---|---|---|---|
| 1,163,152 | 12/1915 | Horward | 239/233 |
| 2,345,030 | 3/1944 | Buckner | 239/233 |
| 2,493,886 | 1/1950 | Lütolf | 403/165 X |
| 2,582,158 | 1/1952 | Porter | 239/222.13 |
| 2,592,753 | 4/1952 | Sigmund | 239/222.13 |
| 2,610,089 | 9/1952 | Unger | 239/230 |
| 2,625,411 | 1/1953 | Unger | 285/97.5 |
| 2,654,635 | 10/1953 | Lazzarini | 239/230 |
| 2,816,798 | 12/1957 | Royer | 239/233 X |
| 2,853,342 | 9/1958 | Kachergis | 239/230 |
| 3,019,992 | 2/1962 | Zecchinato | 239/230 |
| 3,082,958 | 3/1963 | Thomas | 239/234 |
| 3,091,399 | 5/1963 | Kennedy | 239/231 |
| 3,309,025 | 3/1967 | Malcolm | 239/230 |
| 3,391,868 | 7/1968 | Cooney | 239/232 |
| 3,434,665 | 3/1969 | Royer | 239/230 |
| 3,468,485 | 9/1969 | Sully | 239/264 X |
| 3,581,994 | 6/1971 | Heiberger | 239/230 |
| 3,746,259 | 7/1973 | Apri | 239/229 |
| 3,765,608 | 10/1973 | Lockwood | 239/230 |
| 3,782,637 | 1/1974 | Crumpacker | 239/232 |
| 3,837,576 | 9/1974 | Rosenkranz | 239/230 |
| 3,918,642 | 11/1975 | Best | 239/230 |
| 3,918,643 | 11/1975 | Malcohm | 239/230 |
| 3,977,610 | 8/1976 | Royer | 239/230 |
| 3,986,671 | 10/1976 | Nugent | 239/230 |
| 4,164,324 | 8/1979 | Bruninga | 239/230 |
| 4,177,944 | 12/1979 | Wichman | 239/230 |
| 4,461,423 | 7/1984 | Davis | 239/231 |

FOREIGN PATENT DOCUMENTS

| | | | |
|---|---|---|---|
| 560067 | 9/1932 | Fed. Rep. of Germany | 239/231 |
| 889236 | 7/1949 | Fed. Rep. of Germany | 239/231 |

*Primary Examiner*—Joseph F. Peters, Jr.
*Assistant Examiner*—Patrick N. Burkhart
*Attorney, Agent, or Firm*—Kelly, Bauersfeld & Lowry

[57] ABSTRACT

An impact drive sprinkler is provided from a relatively small number of easily assembled components which can be formed predominantly from lightweight molded plastic or the like. The sprinkler includes a unitary sprinkler body having a lower riser tube rotatably supported within a one-piece bearing sleeve adapted for connection to a water supply riser or the like, wherein the lower riser tube is joined to an upper range tube through which an irrigation water stream is projected. An oscillatory impact drive arm and a spring are snap-fit mounted with a controlled spring preload onto the sprinkler body for spring-loaded rotation of the drive arm toward a position with a deflector spoon unit thereon interrupting the projected water stream. A one-piece reversing mechanism is also snap-fit mounted onto the sprinkler body for shifting movement between forward- and reverse-drive positions, with a pair of integral spring arms thereon cooperating with cam surfaces on the sprinkler body to releasably retain the reversing mechanism in the desired position. The sprinkler further includes a combination diffuser and range deflector having a one-piece construction for snap-fitting onto the sprinkler body and adjustable to select the droplet size and range of the projected water stream. A one-piece stream diverter may also be provided in addition to or in lieu of the adjustable diffuser/deflector and includes a spring-loaded diverter blade for variably diverting the projected water stream as a function of water pressure to control stream fall-out distribution.

76 Claims, 20 Drawing Figures

FIG. 1
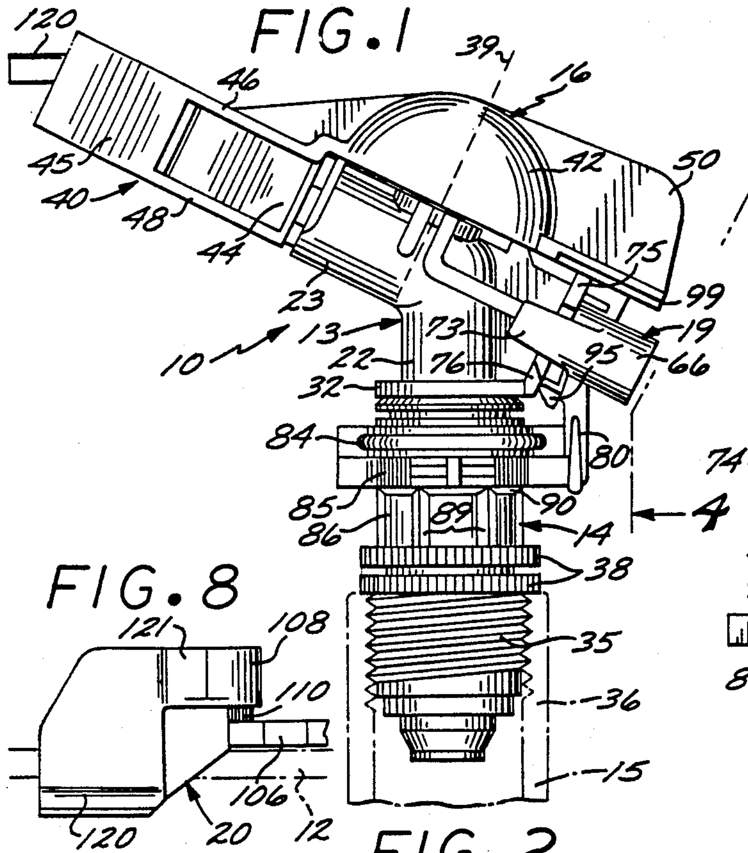
FIG. 8
FIG. 2
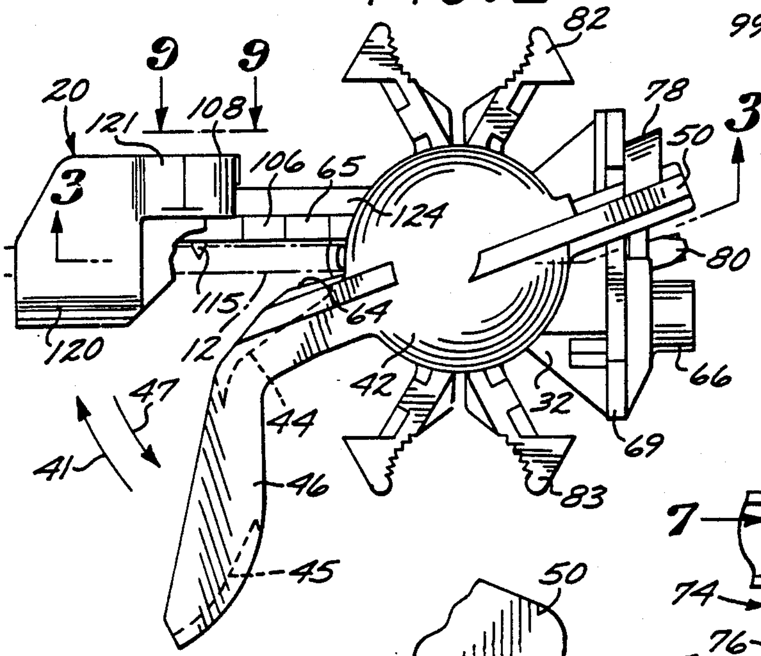
FIG. 4
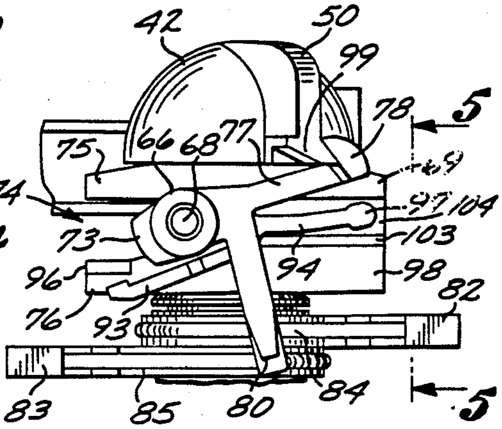
FIG. 5
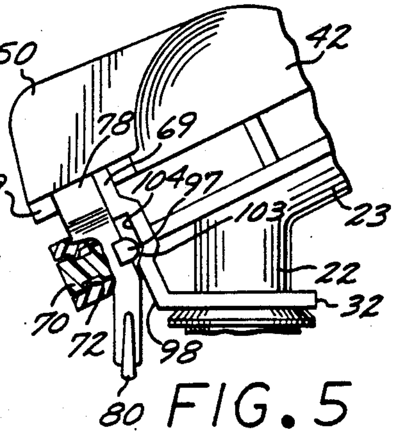
FIG. 6
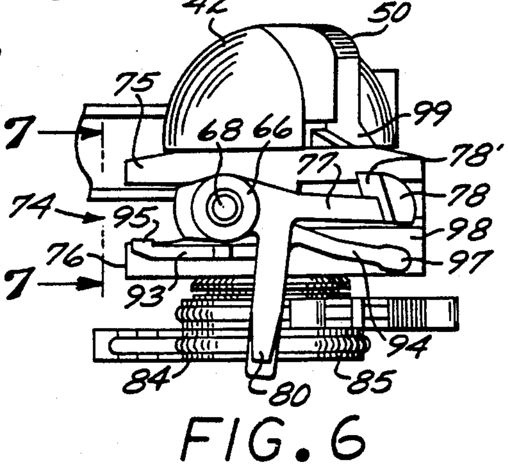
FIG. 7
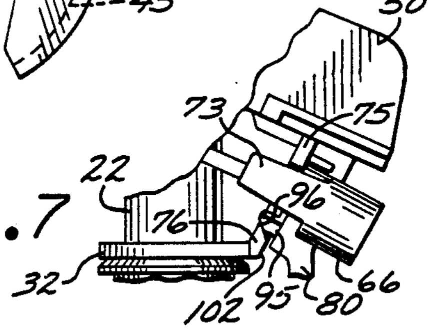

FIG. 9
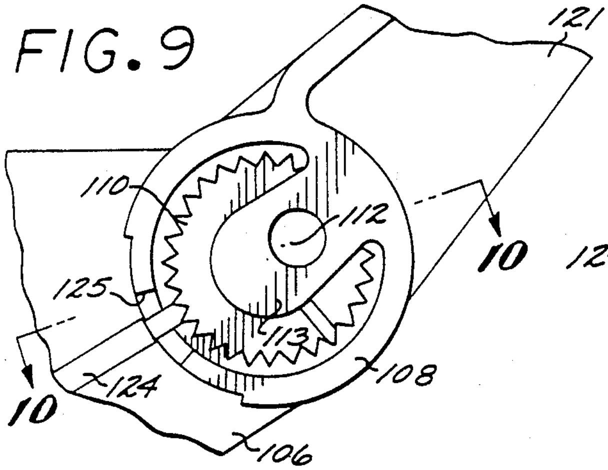
FIG. 10
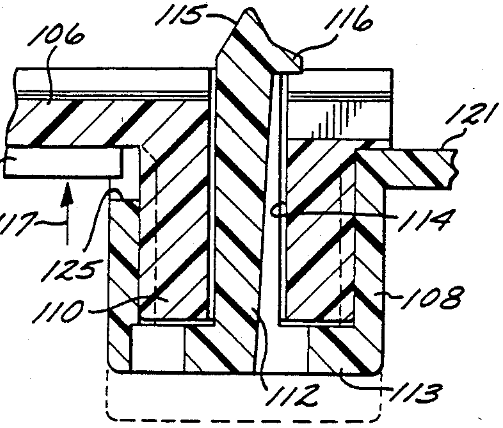
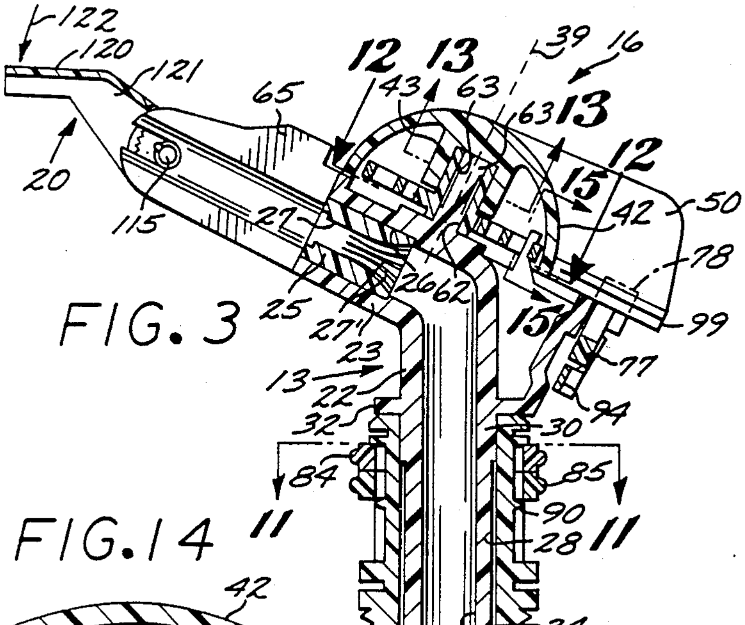
FIG. 3
FIG. 11
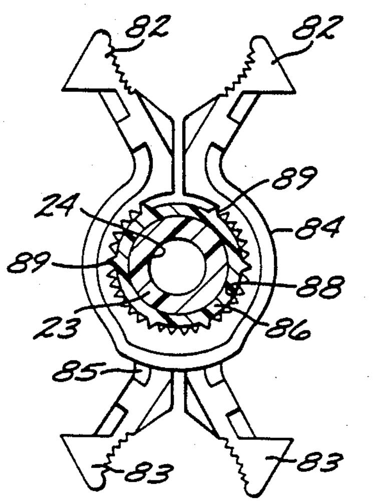
FIG. 14
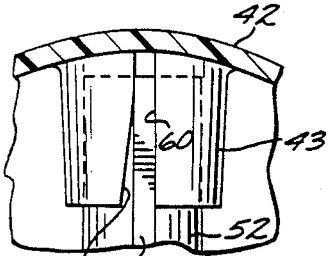
FIG. 12
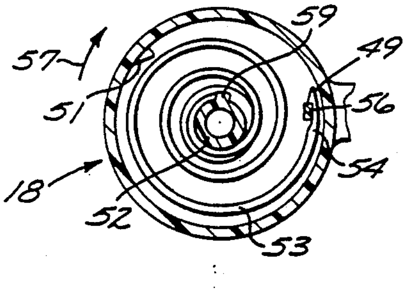
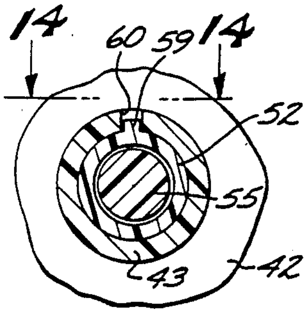
FIG. 13
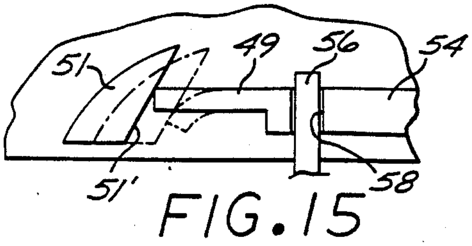
FIG. 15

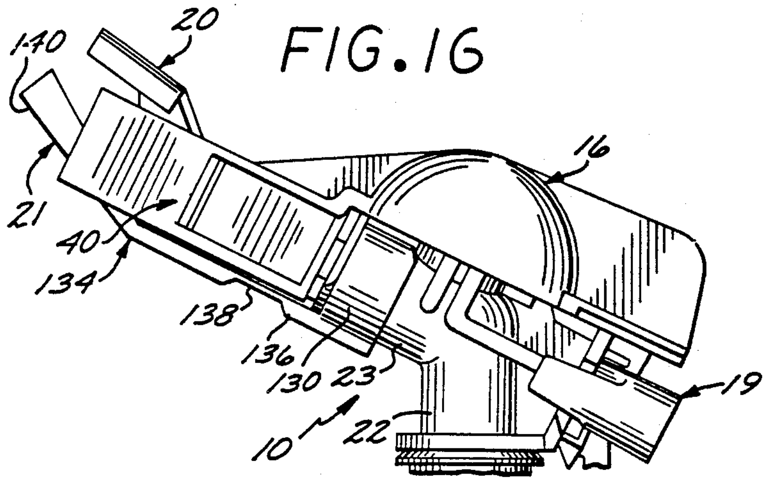
FIG.16
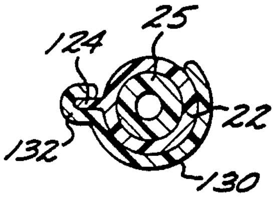
FIG.18
FIG.17
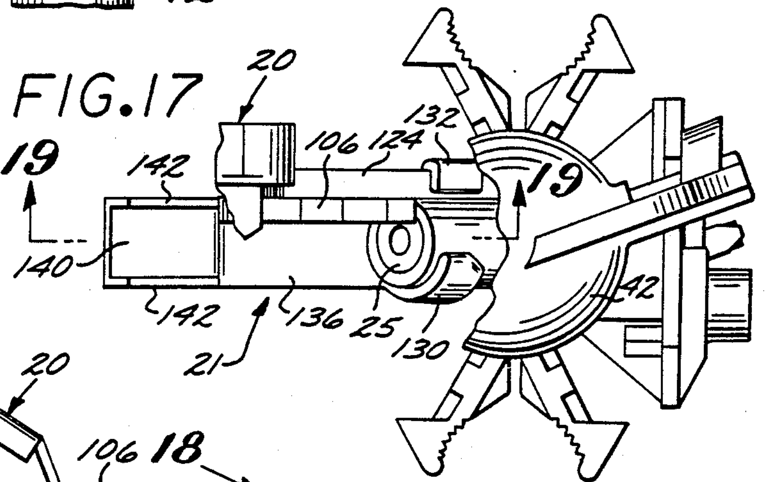
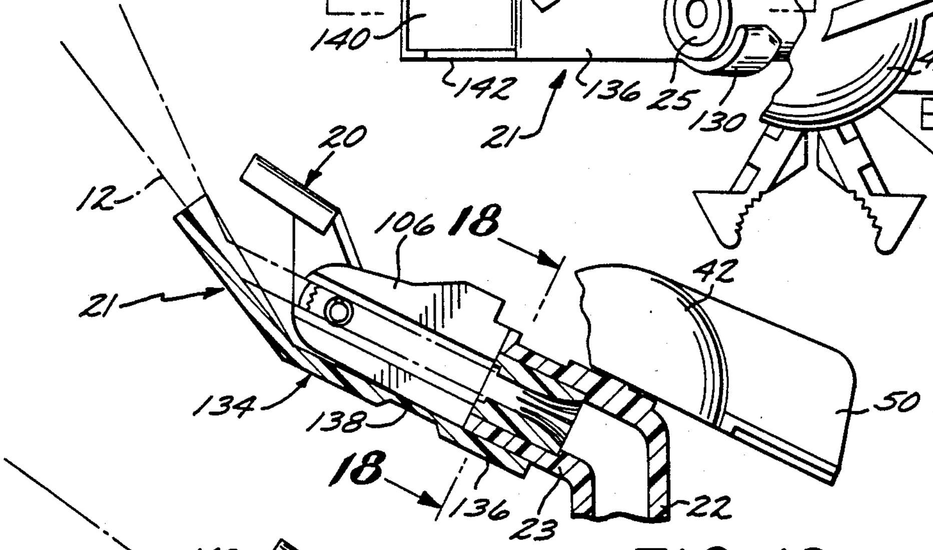
FIG.19
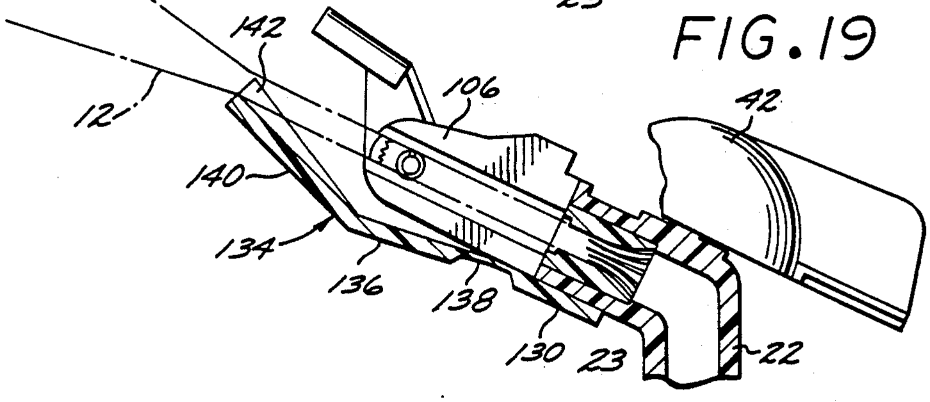
FIG.20

IMPACT DRIVE SPRINKLER

BACKGROUND OF THE INVENTION

This invention relates generally to irrigation sprinklers of the so-called impact drive type. More particularly, this invention relates to an improved impact drive sprinkler constructed from a substantially minimum number of components designed for manufacture from cost-efficient materials and for facilitated assembly.

Impact drive sprinklers are well known for use in supplying irrigation water to irrigate surrounding vegetation, such as grass, shrubs, crops, and the like. A typical impact drive sprinkler includes a sprinkler body rotatably carried within a journal bearing adapted for connection to the upper end of a water supply riser or standpipe. Irrigation water flows upwardly through the water supply riser and passes through the sprinkler body for projection outwardly through a nozzle to provide an irrigation water stream for irrigation purposes. An impact drive arm is mounted on the sprinkler body and urged by a metal coil spring or the like to swing a deflector spoon unit on the drive arm laterally into interrupting engagement with the projected water stream and further to impact one side of the sprinkler body to rotate the sprinkler through a small rotational step about the axis of the water supply riser, thereby slightly shifting the projected direction of the water stream. After such impact, the water stream drives the deflector spoon unit laterally out of the stream resulting in a recoiling of the spring for subsequent spring-biased return of the deflector spoon unit into interrupting stream engagement and impact with the sprinkler body. The sprinkler is thus rotated about the water supply riser axis in a regular sequence of small angular steps to sweep the water stream over a relatively large terrain area.

In such impact drive sprinklers, reversing mechanisms are frequently included to obtain reversible sprinkler rotation back and forth between selected end limits of an arcuate part-circle path. A typical reversing mechanism includes a reversing dog mounted on the sprinkler body for shifting movement between a forward-drive position out of the path of the swinging drive arm to permit sprinkler rotation in one direction and a reverse-drive position for impact engagement by the drive arm at a point for stepwise sprinkler rotation in an opposite direction. The reversing dog is normally shifted and retained in the desired forward- or reverse-drive position by an over-center reversing spring which is tripped by a pivoting trip arm engageable with wings projecting outwardly from friction rings carried about the journal bearing. These wings are set at selected circumferential positions about the journal bearing corresponding with the selected end limits of the part-circle path.

Impact drive sprinklers of the above-described general type are used advantageously to deliver irrigation water to a relatively large terrain area with a relatively small number of irrigation sprinklers. However, in the past, impact drive sprinklers have been constructed from a relatively large number of component parts which generally require careful and typically manual assembly to insure proper sprinkler operation. For example, reversing mechanisms for impact drive sprinklers have constituted relatively complicated structures requiring careful assembly of several component parts which, in operation, are subject to wear and exhibit a tendency to bind or otherwise fail to operate upon accumulation of dirt, grit, or other foreign matter. In addition, the over-center springs used in reversing mechanisms have required significant water pressures for reliable operation, thereby precluding use of impact drive sprinklers in applications limited to relatively low water supply pressures. Moreover, while some plastic parts have been used in impact drive sprinklers, more costly component materials have generally been required for some component parts, such as, for example, metal fulcrum pins for rotatably supporting the drive arm. Metal springs have also generally been required for biasing the drive arm toward a positive interrupting a projected water stream, wherein such springs can require particular manual skill during assembly to apply the desired spring preload force to the drive arm. Still further, other sprinkler control devices such as stream deflectors and/or stream diverters for controlling projected stream range, droplet size, and/or fall-out distribution are known, but generally have required careful manual assembly of multiple component parts.

There exists, therefore, a significant need for an improved impact drive sprinkler formed from a substantially minimum number of inexpensive components, wherein the sprinkler components can be manufactured predominantly or entirely from relatively inexpensive materials, such as lightweight molded plastic or the like. There exists further a significant need for an improved impact drive sprinkler designed for quick and easy component assembly in a manner assuring reliable sprinkler operation and further having the capability for operation at relatively low water pressures. The present invention fulfills these needs and provides further related advantages.

SUMMARY OF THE INVENTION

In accordance with the invention, an improved impact drive sprinkler is constructed from a relatively small number of sprinkler components which can be formed predominantly or substantially entirely from cost-efficient materials, such as lightweight molded plastic or the like. The sprinkler components are designed for quick and easy assembly in a desired orientation for reliable and, if desired, reversible rotational stepping movement during operation.

In one preferred form of the invention, the impact drive sprinkler comprises a unitary sprinkler body having a lower riser tube joined integrally with an upper, outwardly inclined range tube. The riser tube is rotatably supported within a cylindrical one-piece bearing sleeve adapted for connection to the end of a water supply riser or standpipe, with said bearing sleeve being restrained axially about the riser tube between an upper platform on the sprinkler body and a lower seal washer seated within an external groove formed in the riser tube. The sprinkler body is thus rotatable within the journal bearing about the axis of the water supply riser. A water flow path is formed through the lower riser tube and the upper range tube to permit passage of irrigation water from the water supply riser, wherein the water is projected outwardly from the range tube through a discharge nozzle of selected geometry seated within a counterbore at the downstream end of the range tube.

An impact drive arm is mounted on the sprinkler body for oscillatory lateral swinging movement of a conventional deflector spoon unit thereon into interrupting engagement with the projected water stream. This impact drive arm also preferably has a one-piece construction and includes a central hub for prealigned reception of a central bushing carrying a variable rate spring which can be formed integrally with the bushing, such as a flat spiral spring of variable coil width. The spring is initially placed loosely over a drive arm mounting post on the sprinkler body with a notch at the outermost or free end of the spring interlocked with a keeper post on the sprinkler body. The drive arm hub is then press-fitted onto the spring bushing with an external bushing key sliding into a ramped hub keyway to rotate the spring slightly to a position of predetermined preload while the bushing is pressed into snap-fit engagement with the mounting post. When installed, the spring urges the drive arm to swing the deflector spoon unit laterally toward interrupting engagement with the water stream projected from the range tube and further for impact engagement with a portion of the range tube to rotate the sprinkler through a small rotational step about the axis of the lower riser tube.

A one-piece reversing mechanism is mounted on the sprinkler body for reversing the direction of sprinkler rotation within the limits of a selected arcuate path. In the preferred form, the reversing mechanism includes a mounting boss for snap-fit reception of a support post on the sprinkler body. A rocker arm projects laterally from this mounting boss and terminates in a reversing dog. A limit arm on the reversing mechanism extends into an open track defined by spaced legs of a support plate on the sprinkler body for limiting pivoting movement of the rocker arm between a forward-drive position with the reversing dog out of the path of the swinging drive arm to permit sprinkler rotation in one direction and a reverse-drive position with the dog shifted for impact by the drive arm to rotate the sprinkler in an opposite direction. A trip pin on the reversing mechanism extends downwardly to a position circumferentially between outwardly projecting wings of friction rings on the bearing sleeve wherein these wings respectively engage the trip pin to shift the reversing mechanism between the forward- and reverse-drive positions at the end limits of a predetermined part-circle path of rotation. A pair of spring arms on the reversing mechanism are alternately stressed to move cam followers thereon into contact with cam surfaces on the support plate to releasably retain the reversing mechanism in the forward- and reverse-drive positions, while permitting low force shifting between the forward- and reverse-drive positions. The spring arm holding the reversing mechanism in the reverse-drive position advantageously applies a cocking force or moment shifting the mounting boss relative to the suppost post within the limits of any mechanical play therebetween generally in the direction of the subsequent and significantly greater impact force applied by the drive arm to the reversing dog. This cocking force thus preshifts the mounting boss to minimize or eliminate relative movement and accompanying wear between the mounting boss and support post due to drive arm impact with the reversing dog.

In accordance with further aspects of the invention, a combination stream diffuser and range deflector can be mounted on the sprinkler body for adjustably controlling the droplet size within the projected water stream and the range of the stream. In the preferred form, the diffuser and range deflector has a one-piece construction including a diffuser pin for snap-fit reception or the like into a laterally open socket defined by a laterally oriented mounting cylinder on an extension bracket at one side of the range tube. This mounting cylinder carries external, laterally extending ratchet teeth for engagement with mating ratchet teeth within an expansible ratchet sleeve carrying a forwardly projecting deflector plate. The ratchet sleeve can be adjusted laterally upon the mounting cylinder to orient the diffuser pin for interrupting the projected water stream in a manner controlling stream droplet size. In addition, the ratchet sleeve can be rotated about the mounting sleeve to orient the deflector plate for controlled downward deflection of the water stream to control the range thereof.

A one-piece stream diverter can also be mounted onto the sprinkler body in addition to or in substitution for the combined stream diffuser and range deflector described above, wherein the stream diverter is designed for variably interrupting the projected water stream as a function of water pressure to improve the fall-out distribution of water droplets. In a preferred form, the one-piece stream diverter includes a mounting collar for removable installation about the range tube and supporting a diverter blade of a springable material, such as molded plastic or the like. This diverter blade has a spring section extending from the collar in a generally downstream direction with a reduced diameter region defining a living spring-loaded hinge biasing an angularly set diverter section on the downstream end of the spring section into diverting engagement with the water stream. The spring biasing force has a magnitude to retain the diverter section in substantial stream interruption at low water pressure to obtain a substantial stream break-up action resulting in more uniform fall-out distribution over a relatively short range of throw. At higher water pressures, however, the force of the stream automatically displaces the diverter section substantially to one side for little or no stream diversion, the normal stream turbulence at such higher pressure being sufficient to break up the stream for satisfactory fall-out distribution.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a side elevation view of an improved impact drive sprinkler embodying the novel features of the invention;

FIG. 2 is a top plan view of the improved impact drive sprinkler;

FIG. 3 is a longitudinal vertical section of the sprinkler taken generally on the line 3—3 of FIG. 2;

FIG. 4 is a fragmented rear elevation view taken generally on the line 4—4 of FIG. 1 and illustrating a reversing mechanism set in a reverse-drive position;

FIG. 5 is a fragmented right side elevational view of a portion of the sprinkler taken generally on the line 5—5 of FIG. 4;

FIG. 6 is a fragmented rear elevation view generally similar to FIG. 4 but illustrating the reversing mechanism set in a forward-drive position;

FIG. 7 is a fragmented left side elevation view of a portion of the sprinkler taken generally on the line 7—7 of FIG. 6;

FIG. 8 is a top plan view of a portion of the sprinkler generally similar to a forward portion of FIG. 2 but illustrating a combination diffuser and deflector set in a alternative position of adjustment;

FIG. 9 is an enlarged fragmented right side elevation view of a portion of the sprinkler taken generally on the line 9—9 of FIG. 2;

FIG. 10 is a sectional view taken generally on the line 10—10 of FIG. 9;

FIG. 11 is a horizontal sectional view taken generally on the line 11—11 of FIG. 3;

FIG. 12 is a sectional view taken generally on the line 12—12 of FIG. 3;

FIG. 13 is an enlarged sectional view taken generally on the line 13—13 of FIG. 3;

FIG. 14 is a fragmented elevational view, shown partially in vertical section, taken generally on the line 14—14 of FIG. 13;

FIG. 15 is a sectional view taken generally the line 15—15 of FIG. 3 but illustrating the drive arm in a position of maximum swinging movement out of a projected water stream;

FIG. 16 is a fragmented side elevation view of the improved impact drive sprinkler further including a spring-loaded stream diverter;

FIG. 17 is a top plan view of the impact drive sprinkler shown in FIG. 16, with portions broken away to illustrate construction details of the stream diverter;

FIG. 18 is a transverse sectional view through a portion of the sprinkler to illustrate mounting of the stream diverter, generally as viewed on the line 18—18 of FIG. 19;

FIG. 19 is a fragmented longitudinal vertical section taken generally on the line 19—19 of FIG. 17 illustrating operation of the stream diverter at a relatively low water pressure; and FIG. 20 is a fragmented longitudinal vertical section generally similar to FIG. 19 but illustrating operation of the stream diverter at a relatively high water pressure.

DETAILED DESCRIPTION OF THE PREFERRED EMBODIMENT

As shown in the exemplary drawings, an improved impact drive sprinkler referred to generally by the reference numeral 10 is provided for sweeping an outwardly projected water stream 12 through a full-circle or predetermined part-circle path in a series of relatively small rotational steps. The impact drive sprinkler 10 comprises a unitary sprinkler body 13 rotatably supported within a one-piece journal bearing sleeve 14 which is adapted for connection to the upper end of a water supply riser or standpipe 15, shown in dotted lines in FIG. 1. An oscillatory drive arm 16 is biased by a spring 18 (FIG. 3) for interrupting the water stream 12 and for impact engagement with the sprinkler body 13, with a one-piece reversing mechanism 19 providing reversible sprinkler operation when desired. In addition, a combination stream diffuser and range deflector 20 (FIG. 2) is provided for adjustable control of droplet size and projected range of the water stream 12, and a spring-loaded stream diverter 21 (FIGS. 16–20) may be provided for automatic pressure-responsive control of stream droplet fall-out distribution.

The improved impact drive sprinkler of the present invention is constructed from a relatively small and substantially minimum number of component parts adapted for rapid and easy assembly in orientations for reliable operation in use. More particularly, the sprinkler 10 is formed from component parts adapted for highly economical manufacture substantially or entirely from relatively cost-efficient materials, particularly such as lightweight molded plastic and the like. These component parts are designed for rapid and facilitated assembly manually or with automated assembly equipment with the various parts oriented in the desired positions for correct, reliable sprinkler operation. The spring 18 advantageously may comprise a variable rate spring providing biasing forces to the drive arm 16 which increase with the magnitude of drive arm swinging movement to insure proper oscillatory drive arm movement throughout a broad range of water supply pressures. The one-piece reversing mechanism 19 insures reliable reversible rotational stepping of the sprinkler substantially without operational failure due to wear or accumulation of dirt, grit, and the like. Moreover, the combination stream diffuser and deflector 20 advantageously provides, in a single component part, controlled independent adjustment of both the water droplet size and the overall projected range of the irrigation water stream discharged from the sprinkler. Similarly, the spring-loaded stream diverter 21 provides automatic maintenance of a relatively uniform stream fall-out distribution using a single component part.

As shown best in FIGS. 1 and 3, the unitary sprinkler body 13 is formed from molded plastic or the like to include a lower riser tube 22 of generally cylindrical shape joined integrally at an upper end to an outwardly projecting, inclined upper range tube 23. The riser tube 22 and the range tube 23 cooperatively define a smooth-walled flow path 24 extending upwardly through the riser tube 22 for receiving water from the water supply riser 15 and then turning outwardly through the range tube 23 with a selected upward inclination angle for discharge passage of the irrigation water stream 12. As shown in FIG. 3, in one preferred form of the invention, a generally cylindrical discharge nozzle 25 formed from molded plastic or the like is seated as by press-fitting into an enlarged counterbore 26 at the downstream end of the range tube 23, wherein this discharge nozzle 25 includes a nozzle passage 27 of selected geometry for tailoring the physical characteristics of the projected water stream 12. For example, the illustrative nozzle passage 27 has a converging cross-sectional shape including longitudinally oriented anti-swirl vanes 27', although other known nozzle configurations can be used. Alternately, if desired the discharge nozzle 25 can be secured by threads or other known fastening means at the discharge end of the range tube 23.

The one-piece journal bearing sleeve 14 is also formed preferably from a lightweight molded plastic or the like with a generally cylindrical shape having a smooth-walled central bore 28 sized for rotatably receiving the lower riser tube 22 of the sprinkler body 13. More particularly, as shown in FIG. 3, the bearing bore 28 of the sleeve 14 is sized for relatively close sliding reception over a pair of axially spaced, radially enlarged bearing lands 30 formed on the riser tube 22 to provide a relatively low friction rotational coupling with minimal surface contact therebetween. The axially upper end of the bearing sleeve 14 is seated against a radially enlarged platform 32 near the upper end of the riser tube 22, and an annular resilient seal washer 33 is received into an external groove 34 near the lower end of the riser tube 22 to axially retain the bearing sleeve 14 for rotation about the riser tube.

The exterior surface of the one-piece bearing sleeve 14 is formed to include a lower male threaded portion 35 for appropriate threaded reception into a female threaded upper end 36 of the water supply riser 15, as viewed in FIG. 1. A pair of radially outwardly projecting ribs 38 are formed on the bearing sleeve 14 immediately above the lower threaded portion 35, wherein these ribs 38 are conveniently knurled or externally serrated for easy manual grasping. Alternatively, these ribs 38 can include appropriate flats (not shown) for convenient engagement with a wrench or the like for threadably mounting the bearing sleeve onto the water supply riser 15. Accordingly, when installed on the riser 15, the bearing sleeve 14 rotatably supports the sprinkler body 16 for rotation of the sprinkler body about an axis generally coaxial with the water supply riser 15 and the lower riser tube 22 of the sprinkler body 13.

The unitary sprinkler body 13 is rotatably driven in relatively small rotational steps by the impact drive arm 16 by a combination of impact and hydraulic reaction forces, in a manner conventional with impact drive sprinklers. More particularly, this impact drive arm 16 is mounted on top of the sprinkler body 13 for oscillatory movement about an axis oriented generally perpendicular to the inclined range tube 23, as indicated by reference numeral 39 in FIGS. 1 and 3. A deflector spoon unit 40 is formed at a front end of the drive arm 16 for repetitive interruption of the discharged irrigation water stream 12 and for impact engagement with the sprinkler body 13. However, the impact drive arm 16 is mounted on the range tube 23 and desirably subjected to a predetermined spring preload force in a manner corresponding with one major aspect of the present invention.

More specifically, the illustrative impact drive arm 16 has a unitary construction formed preferably from a lightweight molded plastic or the like to include a central, generally hemispherical and downwardly open hood 42 formed generally integral with and overlying a downwardly open central hub 43. The deflector spoon unit 40 protrudes forwardly from the hood 42 (FIGS. 1 and 2) and includes, in the illustrative drawings, a deflector vane 44 and a curved deflector spoon 45 supported in generally upstanding relation between a pair of upper and lower struts 46 and 48, with the upper strut 46 being joined to the hood 42. The deflector vane 44 and the deflector spoon 45 have geometries generally well known to those skilled in the art of impact drive sprinklers, such as a geometry shown and described, for example, in U.S. Pat. No. 3,022,012, whereby the specific configuration and operation of the deflector vane and deflector spoon are not described in further detail herein. A counterweight arm 50 protrudes generally rearwardly from the central hood 42 with a mass generally counterbalancing the drive arm for relatively smooth oscillatory movement about the axis 39.

The spring 18 is interconnected between the impact drive arm 16 and the unitary sprinkler body 13 preferably with a controlled spring preload urging the drive arm to swing the deflector spoon unit 40 toward interrupting engagement with the irrigation water stream 12. This spring 18 desirably comprises a variable rate spring which may be formed from lightweight molded plastic, metal, or other suitable spring material, preferably with a one-piece construction, to include a central cylindrical bushing 52 carrying near its lower end an outwardly spiraling spring coil 53 formed with a uniform radial coil thickness with the radial intercoil spacing increasing progressively from the central bushing 52 toward an outermost or free end 54. Alternately, the coil 53 can have a constant intercoil spacing with a radial coil thickness increasing from the bushing 52 to its free end 54. Still further, the spring can be designed with a combination of variable and constant rate regions upon wind-up. For assembly, the central spring bushing 52 is initially placed loosely over a short mounting post 55 formed integrally with and upstanding from the sprinkler body 13 generally along the drive arm oscillatory axis 39. Slight rotation of the spring bushing 52 about the mounting post 55 carries the spring free end 54 into locking engagement with a short keeper post 56 upstanding from the sprinkler body 13 wherein this locked engagement is obtained by reception of the keeper post 56 into a radially inwardly open notch 58 (FIG. 15) formed in the spring coil 53 near the free end 54 thereof.

With the spring engaged with the keeper post 56, the impact drive arm 16 is installed onto the sprinkler by press-fitting the downwardly open hub 43 beneath the hood 42 over the spring bushing 52 on the mounting post 55. During this movement, correct alignment between the drive arm 16 and the spring 18 is assured by reception of an external longitudinal key 59 on the spring bushing 52 into a longitudinal keyway 60 in the drive arm hub 43. Importantly, as viewed in FIG. 14, the forward margin 60' of the keyway 60 is ramped forwardly and downwardly to provide an enlarged keyway opening into which the bushing key 59 is guided and then drawn rearwardly to partially coil the spring 18 thereby providing a predetermined spring preload acting upon the drive arm 16.

Downward press-fitting motion of the drive arm 16 onto the spring bushing 52 simultaneously presses the spring bushing 52 downwardly for snap-fitting engagement with the mounting post 55. More particularly, as shown best in FIG. 3, the mounting post 55 includes upper and lower bearing lands 62 sized for rotationally supporting the spring bushing 52 with minimal surface area contact. A small internal rib 63 within the spring bushing 52 is sized for yieldable passage of the upper bearing land on the mounting post 55 and then for snap-fit engagement beneath the upper bearing land to retain the spring bushing rotatably upon the mounting post 55. When this snap-fit engagement is achieved, the drive arm 16 and the spring bushing 52 are rotatable as a unit about the axis 39 of the mounting post 55, with the outer free end 54 of the spring coil 53 being supported against rotation by the keeper post 56. The hood 42 conveniently shields this rotational coupling to prevent binding or other operational failure from exposure to dirt, grit, or the like.

During normal forward-drive operation of the impact drive sprinkler 10, the impact drive arm 16 rotates the sprinkler about the axis of the riser tube 22 in a clockwise direction, as viewed in FIG. 2, through a repeated series of relatively small angular steps. More particularly, the spring 18 urges the drive arm to swing the deflector spoon unit 40 toward a position placing the deflector vane 44 in interrupting engagement with the outwardly projected water stream 12, as indicated by arrow 41. As the trailing edge of the deflector vane 44 interrupts the water stream, the vane is drawn rapidly in a well-known manner completely into the water stream to correspondingly carry a side margin 64 of the spoon unit 40 into impact engagement with an impact tab 65 on the sprinkler body 13. This impact engagement rotates the sprinkler through a small rotational increment while the vane-deflected water stream temporarily passes behind the deflector vane 44 for guided reaction against the curved deflector spoon 45. Reaction forces between the water stream and the deflector spoon 45 swing the drive arm 16 in a reverse direction laterally out of the water stream, in a direction indicated by arrow 47 in FIG. 2. This reverse drive arm rotation is accompanied by a recoiling or winding up of the spring 18 which ultimately overcomes the reaction forces and again reverses the direction of drive arm swinging movement for subsequent stream interruption and engagement with the impact tab 65. In this manner, the sprinkler body 13 is rotated through a succession of small angular steps to correspondingly shift the projected direction of the irrigation water stream 12. This stepwise rotation continues through sequential full-circle rotations about the axis of the riser tube 22 unless the reversing mechanism 19 is set for reversible part-circle rotation.

In accordance with one aspect of the invention, the spring 18 provides a relatively small biasing force acting upon the drive arm 16 at a rest position prior to water flow through the sprinkler. Upon initiation of water flow, this small biasing force can be overcome by the water stream 12 at a relatively low fluid pressure to begin oscillating drive arm motion and impact sprinkler driving at a low water pressure. However, the variable rate spring can also be used at higher water pressures, since such higher pressures increase oscillatory drive arm displacement to correspondingly increase the spring resistance force applied to the drive arm.

The spring 18 further includes means for substantially increasing the spring force applied to the drive arm 16 when the sprinkler is used with still higher water pressure to prevent the drive arm from sharply impacting a rear portion of the sprinkler body 13 while swinging out of or away from the water stream 12, wherein such impact could otherwise result in undesired reverse rotational driving between forward-drive steps. More particularly, as shown in FIGS. 12 and 15, the free end 54 of the spring coil 53 includes a rate stepper finger 49 of reduced thickness projecting a short distance beyond the keeper post 56 to provide a limit stop preventing drive arm overrotation. This finger 49 is engageable with an angularly set tab 51 molded onto the drive arm 16 beneath the protective hood 42 at a selected position spaced arcuately from the keeper post 56 in accordance with the desired maximum angle of drive arm swing.

As the drive arm 16 rotates the deflector spoon unit 40 away from the water stream 12, the tab 51 rotates with the hood 42 in the direction of arrow 57 in FIG. 12 toward the rate stepper finger 49. In the event the drive arm is driven in this direction with sufficient energy, an angled rear surface 51′ of the tab 51 swings into contact with the rate stepper finger 49, which thereupon is deflected downwardly as viewed in dotted lines in FIG. 15 to provide a substantial step increase in spring resistance to the drive arm swing. As a result, the drive arm is rapidly slowed and stopped for spring-biased return movement of the spoon unit 40 toward the water stream 12, without undesired reverse stepping of the sprinkler due to drive arm impact at the maximum angle of drive arm swing.

The reversing mechanism 19 is supported on the sprinkler body 13 for shifting movement between a forward-drive position permitting normal forward stepwise rotation of the sprinkler, as described above, and a reverse-drive position for impact driving the sprinkler in small rotational steps in a reversed rotational direction. This reversing mechanism 19 advantageously comprises a one-piece component part formed preferably from lightweight molded plastic or the like and adapted for rapid mounting onto the sprinkler body in a predetermined orientation for proper reversible driving of the sprinkler.

More specifically, as shown best in FIGS. 4–7, the illustrative reversing mechanism 19 comprises a cylindrical mounting boss 66 sized for relatively close sliding reception over a short mounting post 68 projecting generally rearwardly from a rear support plate 69 formed integrally with the sprinkler body 13. This mounting post is oriented preferably along an axis generally parallel to and offset slightly to one side of the inclined range tube 23, as shown in FIGS. 2 and 5, and includes an axially spaced pair of radially enlarged bearing lands 70 for rotatably supporting the mounting boss 66 with a relatively small surface area. An annular internal rib 72 within the mounting boss is yieldable to permit snap-fit passage of the rearward bearing land 70 and then axially retains the mounting boss for rotation upon the mounting post 68.

The orientation of the reversing mechanism 19 when fitted onto the mounting post 68 is predetermined by a limit arm 73 protruding from one side of the mounting boss 66 generally in a forward direction into an open track 74 defined by a pair of laterally projecting and vertically spaced legs 75 and 76 of the support plate 69. This limit arm 73 thus orients a rocker arm 77 in a position projecting laterally from an opposite side of the mounting boss 66. Importantly, the distal or outer end of the rocker arm 77 terminates in an upwardly projecting reversing dog 78, with the limit arm 73 permitting rotation of the mounting boss 66 about the mounting post 68 through a sufficient angular displacement to shift the reversing dog 78 between forward-drive and reverse-drive positions, as will be described herein in more detail.

The reversing mechanism 19 further includes a trip pin 80 projecting downwardly from the rocker arm 77 at a position offest laterally to one side of the mounting boss 66. This trip pin has sufficient length to extend into operative relation with outwardly projecting wings 82 and 83 of a pair of friction rings 84 and 85 carried about an upper portion 86 of the journal bearing sleeve 14. In the preferred form, these friction rings 84 and 85 are formed from lightweight molded plastic or the like with ratcheted inner diameter surfaces 88, as viewed in FIG. 11, for releasable engagement with upstanding ratchet teeth 89 formed at intervals about the circumference of the bearing sleeve upper portion 86. A lower annular seat flange 90 (FIG. 3) on the bearing sleeve conveniently retains the friction rings 84 and 85 in vertical positions for engagement of their outwardly projecting wings 82 and 83 with the trip pin 80, whereby the friction rings can be rotationally set with their wings at predetermined circumferential positions about the bearing sleeve 14 defining predetermined end limits of a selected arcuate path of sprinkler rotation, in a manner well known to those skilled in the art of impact drive sprinklers.

In the forward-drive position, the trip pin 80 of the reversing mechanism 19 is shifted by one of the friction ring wings to rotate the rocker arm 77 and the reversing dog 78 to a position spaced below the overlying oscillatory drive arm 16, as viewed in FIGS. 6 and 7. In this position, the drive arm 16 is free to oscillate for sequential interruption of the projected water stream 12 and for impact drive engagement with the impact tab 65 to rotate the sprinkler in steps in a forward direction as indicated by arrow 41 in FIG. 2.

The reversing mechanism 19 includes spring means for releasably retaining the reversing dog 78 in the forward drive position to prevent inadvertent or untimely shifting to a reverse-drive position, as will be described. More particularly, a pair of spring arms 93 and 94 project from the trip pin 80 near the upper end thereof in laterally opposite directions. The spring arm 93 terminates in a cam follower 95 which is positioned by movement of the spring arm 93 in the forward-drive position toward a normal unstressed condition with the cam follower 95 in abutting contact with a wedged cam surface 96 along the upper margin of the lower track leg 76 of the support plate 69. At the same time, in the forward-drive position, the other spring arm 94 is retained in a stressed condition with a cam follower 97 at the free end thereof spring-retained by the arm 94 against a flat cam surface 98 defined by an opposite portion of the support plate 69. Accordingly, the spring action of the spring arm 94 tends to cock the reversing mechanism 19 slightly and sufficiently to retain the cam follower 95 on the other spring arm 93 in engagement with the wedged cam surface 96, thereby retaining the reversing mechanism in the forward-drive position.

When the sprinkler rotates in a forward direction to an end limit of a reversible arcuate path, the trip pin 80 is shifted by a wing on the other of the friction rings 84 and 85 to the reverse-drive position, as shown in FIGS. 4 and 5. In this reverse-drive position, the reversing dog 78 is rotated upwardly into the plane of oscillatory movement of the rear counterweight arm 50 on the impact drive arm 16. In this position, an angled impact surface 78' on the reversing dog 78 prematurely interrupts swinging movement of the drive arm away from the water stream 12 for impact engagement of the reversing dog by a lower wedge-shaped foot 99 on the drive arm. This impact engagement with the reversing dog 78 imparts a rotational force tending to rotate the sprinkler 10 in a reverse direction through the predetermined arcuate path, as indicated by arrow 47 in FIG. 2. Such stepwise reverse rotation is continued, of course, until the sprinkler reaches the opposite end limit and the trip pin 80 is shifted back to the forward-drive position.

The spring arms 93 and 94 of the reversing mechanism 19 also function to releasably retain the reversing mechanism in the reverse-drive position. More specifically, shifting movement of the trip pin 80 to the reverse-drive position is accompanied by simultaneous movement of the first spring arm 93 toward a stressed position as the cam follower 95 thereon rides rearwardly over the cam surface 96 to rest upon a flat surface 102 on the track leg 76. At the same time, the second spring arm 94 is shifted to a normal unstressed condition as the cam follower 97 thereon rides upwardly from the flat cam surface 98 and travels forwardly along a ramped surface 103 to rest upon a second, forwardly disposed flat surface 104. Accordingly, the second spring arm 94 is held by the spring action of the first spring arm 93 to retain the mechanism in the reverse drive position. This retention force applied to the spring arm 93 advantageously applies a small cocking force or moment to the mounting boss 66 to reshift said boss 66 relative to the mounting post 68 in accordance with mechanical play therebetween generally in the direction of impact force applied by the drive arm to the reversing dog 78, but prior to application of such impact forces. Accordingly, the preshifted mounting boss 66 is positioned for little or no relative movement on the mounting post 68 in response to the impact force to minimize or eliminate wear between the boss 66 and the post 68 notwithstanding their construction of molded plastic.

The stressed/unstressed conditions of the two spring arms 93 and 94 are thus reversed as the trip pin moves to the reverse-drive position, and vice versa, to maintain the reversing mechanism in the desired position while permitting ready shifting between the two positions. Advantageously, the retention forces applied by the spring arms are relatively low in magnitude to permit shifting at relatively low water pressures which provide small driving energy to the drive arm. Moreover, the retention forces are substantially independent of dirt or grit accumulation thereby rendering the reversing mechanism highly reliable in operation.

In accordance with a further aspect of the impact drive sprinkler of the present invention, the combination stream diffuser and deflector 20 provides a simple and easily adjustable device for controlling the droplet size of the projected water stream 12 and/or for controlling the projected range of the water stream. In the preferred form, this diffuser/deflector 20 has a one-piece construction of molded plastic or the like for convenient, preferably snap-fit mounting onto an extension bracket 106 projecting outwardly from the discharge end of the upper range tube 23 along one side of the projected water stream 12.

More specifically, as shown best in FIGS. 2, 3, and 8–10, the combination diffuser/deflector 20 comprises a generally cylindrical ratchet sleeve 108 sized to fit laterally over a mounting cylinder 110 protruding laterally from the outboard side of the extension bracket 106, wherein the ratchet sleeve 108 and mounting cylinder 110 have engaged laterally projecting ratchet teeth for releasably supporting the ratchet sleeve 108 in a selected rotational position. A diffuser pin 112 is joined to an outboard end wall 113 of the ratchet sleeve 108 and extends along a central axis of the ratchet sleeve through a central bore 114 in the mounting cylinder 110 and terminates in a tapered diffusion tip 115 projecting beyond the inboard side of the extension bracket 106. A snap tab 116 is conveniently carried by the diffusion tip 115 for snap-fit reception through the mounting cylinder bore 114 to retain the diffuser/deflector 20 on the mounting cylinder 110.

The length of the diffuser pin 112 and the location of the snap tab thereon are chosen to permit axial displacement of the diffuser pin 112 in a manner controlling diffusion of the water stream 12, thereby controlling water droplet size. More particularly, the ratchet sleeve can be pressed fully onto the mounting cylinder 110 as indicated by arrow 117 in FIG. 10 to position the diffusion tip 115 of the pin 112 substantially within the water stream 12 projected from the range tube 23. In this position, substantial water diffusion occurs to provide significant stream break-up and relatively small water droplet size. Alternatively, the ratchet sleeve 110 can be retracted partially from the mounting cylinder 110, as indicated by dotted lines in FIG. 10, to withdraw the snap tab 116 into abutting engagement with the extension bracket 106 and correspondingly to withdraw the diffusion tip 115 substantially from the water stream 12 to avoid significant diffusion thereof, as shown in FIG. 8.

Stream range control is provided by a deflector plate 120 which is turned laterally over the water stream 12 at the forward end of a support arm 121 formed integrally with and projecting forwardly from the ratchet sleeve 108. Accordingly, rotation of the ratchet sleeve 108 about the mounting cylinder 110 angularly shifts the deflector plate 120 downwardly in the direction of arrow 122 in FIG. 3 into deflecting relation with the projected water stream 12. This ratchet sleeve rotation is made possible by interrupting the circumference of the sleeve 108 by a notch 125 thereby permitting sufficient ratchet sleeve expansion for the engaged ratchet teeth to ride over each other followed by reengagement of the ratchet teeth. Deflection of the water stream by the deflector plate 120 knocks down or blocks the stream to significantly and effectively reduce the projected range thereof. The engaged ratchet teeth on the ratchet sleeve 108 and mounting cylinder 110 conveniently lock the deflector plate against inadvertent displacement, for example, due to hydraulic reaction forces. In addition, the magnitude of angular deflector plate shifting can be limited to a prescribed range by a laterally outwardly projecting reinforcing rib 124 on the extension bracket 106 which is received into the arcuate notch 125 formed in the ratchet sleeve 108.

In accordance with a still further aspect of the invention, the spring-loaded stream diverter 21 provides automatic, pressure-responsive maintenance of stream fall-out distribution relatively uniform throughout projected stream range, wherein the stream diverter 21 is advantageously constructed from a single component part preferably of lightweight molded plastic or the like. This stream diverter 21 can used in addition to the adjustably set diffuser/deflector 20, or, alternately, the stream diverter can be used in lieu of the diffuser/deflector 20.

The preferred stream diverter 21, as shown in FIGS. 16–20 comprises a part-circle mounting collar 130 having a size and sufficient resiliency to be fitted about the range tube 23 in clamped relation therewith generally at the downstream end thereof. As shown in FIG. 18, this mounting collar 130 conveniently includes a radially inwardly open clasp 132 at one side thereof for reception over the reinforcing rib 124, which continues in a downstream direction along the extension bracket 106, to prevent rotation of the mounting collar about the range tube.

A diverter blade 134 is joined to the mounting collar 130 and includes a spring section 136 extending in a downstream direction alongside and preferably generally parallel to the water stream 12 projected from the range tube 23, with said spring section 136 extending beneath the water stream 12, as shown in the exemplary drawings. This spring section 136 is shaped to include an intermediate region of somewhat reduced cross-sectional thickness to define a so-called living spring-loaded hinge 138. A diverter section 140 of the diverter blade 136 is angularly set at the downstream end of the spring section 136 to project normally in a downstream direction and angularly into diverting or deflecting interrupting engagement with the water stream 12. Upstanding sidewalls 142 may be provided along the opposite side margins of this diverter section to confine the water stream therebetween for optimizing interaction with the water stream.

During operation of the impact drive sprinkler 10 at a relatively low water pressure, the projected water stream 12 possesses little or minimal internal stream turbulence normally resulting in formation of relatively large water droplets which, if not broken apart, tend to fall out onto an irrigated soil area spaced from the sprinkler, correspondingly resulting in inadequate close-in watering near the sprinkler. The stream diverter 21 provides the desired stream break-up at low water pressures since the spring-loaded hinge 138 applies a sufficient biasing force to maintain the diverter section 140 in interrupting engagement with the water stream, as viewed in FIG. 19. This stream interruption breaks apart large droplets to more uniformly distribute the water stream throughout a projected range. As water pressure is increased, however, the internal stream turbulence increases to provide progressively improved stream fall-out distribution, which is accompanied by a progressive retraction of the diverter section 140 from the water stream as the more forceful stream overcomes the biasing force of the hinge 138. Accordingly, the level of stream break-up provided by the diverter section 140 is automatically reduced with increases in steam break-up attributable to stream turbulence. At higher water pressures, as viewed in FIG. 20, the diverter section 140 is displaced by the water stream 12 substantially to one side where it does not significantly detract from overall stream range. When water pressure is reduced, the spring-loaded stream diverter returns automatically to the appropriate interrrupting position providing the required level of stream break-up.

The impact drive sprinkler 10 of the present invention is thus constructed from a substantially minimum number of component parts while providing for a high degree of operational control and adjustment during use. These component parts are adapted for manufacture from relatively inexpensive materials, particularly such as lightweight plastic and the like, and are designed for rapid assembly in positions oriented for reliable operation in use.

A variety of modifications and improvements to the impact drive sprinkler described herein are believed to be apparent to those skilled in the art. Accordingly, no limitation on the invention is intended by way of the description herein, except as set forth in the appended claims.

What is claimed is:

1. An impact drive sprinkler for connection to a water supply riser or the like, comprising:

a unitary sprinkler body having a lower riser tube and an upper, outwardly directed range tube, said riser tube and said range tube cooperating to define a water flow path for receiving water from the water supply riser and for guiding the water through said sprinkler body for projection as a water stream outwardly from said range tube;

a journal bearing sleeve rotatably received about said riser tube and including means for connection to the water supply riser, said journal bearing sleeve supporting said sprinkler body for rotation with respect to the water supply riser and about a central axis of said riser tube;

an impact drive arm assembly including an impact drive arm having a deflector spoon unit, means for mounting said drive arm for oscillating swinging movement of said deflector spoon unit into interrupting engagement with the water stream and impact engagement with said sprinkler body, and spring means for urging said drive arm to swing said deflector spoon unit toward interrupting engagement with the water stream and impact engagement with said sprinkler body whereby said drive arm assembly rotatably indexes said sprinkler body in a forward rotational direction in a succession of relatively small steps about said riser tube central axis;

a one piece reversing mechanism mounted on said sprinkler body and including a reversing dog, said reversing mechanism being movable between a forward-drive position with said reversing dog out of the swinging path of movement of said drive arm and a reverse-drive position for impact engagement by said drive arm to rotate said sprinkler body stepwise in a reverse rotational direction;

said reversing mechanism further including first and second spring arms engageable with said sprinkler body for releasably retaining said reversing mechanism respectively in the forward- and reverse-drive positions, said first and second spring arms being movable respectively to stressed and unstressed conditions when said reversing mechanism is in the forward-drive position and respectively to unstressed and stressed conditions when said reversing is in the reverse-drive position; and means for shifting said reversing mechanism between said forward- and reverse-drive positions in response to rotational movement of said sprinkler body to an end limit of a predetermined arcuate rotational path about said riser tube central axis.

2. The impact drive sprinkler of claim 1 further including means for controlling droplet size of the projected water stream.

3. The impact drive sprinkler of claim 1 further including means for controlling the range of the projected water stream.

4. The impact drive sprinkler of claim 1 further including a one-piece water stream diffuser and range deflector movably mounted on said sprinkler body for independent adjustment of droplet size and projected range of the water stream projected from said range tube.

5. The impact drive sprinkler of claim 4 wherein said sprinkler body includes a laterally projecting mounting cylinder positioned generally at one side of said range tube and having laterally oriented external ratchet teeth, said water stream diffuser and range deflector comprising a ratchet sleeve receivable over said mounting cylinder and having internal ratchet teeth matingly engageable with the teeth on said mounting cylinder, said ratchet sleeve carrying a diffuser pin extending generally through a central bore of said mounting cylinder and terminating in a diffusion tip, said ratchet sleeve further carrying a support arm extending generally perpendicular to said diffuser pin and joined to a deflector plate extending laterally toward the water stream;

said ratchet sleeve being movable on said mounting cylinder generally parallel to said diffuser pin to displace said diffusion tip between a first position substantially interrupting the water stream and a second position substantially avoiding water stream interruption;

said ratchet sleeve being rotatable about said mounting cylinder to move said deflector plate between a first position angularly deflecting the water stream and a second position substantially avoiding water stream deflection, said interengaged ratchet teeth on said mounting cylinder and ratchet sleeve releasably retaining said ratchet sleeve in a desired rotational position about said mounting cylinder.

6. The impact drive sprinkler of claim 5 including means for limiting the range of permitted rotation between said ratchet sleeve and said mounting cylinder.

7. The impact drive sprinkler of claim 4 wherein said water stream diffuser and range deflector includes means for snap-fit mounting onto said sprinkler body.

8. The impact drive sprinkler of claim 1 wherein said first spring means comprises a variable rate spring.

9. The impact drive sprinkler of claim 1 wherein said sprinkler body, said journal bearing sleeve and said reversing mechanism are formed from molded plastic.

10. The impact drive sprinkler of claim 9 wherein said drive arm assembly is formed from molded plastic.

11. The impact drive sprinkler of claim 1 wherein said riser tube includes a pair of radially enlarged bearing lands of relatively small surface area for rotatably supporting said riser tube within said journal bearing sleeve.

12. The impact drive sprinkler of claim 1 wherein said riser tube includes a radially outwardly projecting platform near the upper end thereof and a radially outwardly open annular groove near the lower end thereof, said journal bearing sleeve being received about said riser tube with one axial end thereof for abutting relation with said platform, and further including a seal washer seatable within said groove for abutting relation with an opposite axial end of said journal bearing sleeve for axially retaining said sleeve on said riser tube.

13. The impact drive sprinkler of claim 1 wherein said reversing mechanism further includes a trip pin extending downwardly generally alongside said riser tube, said shifting means comprising a pair of friction rings carried by said journal bearing sleeve and each including at least one radially outwardly projecting wing for engaging said trip pin to shift the position of said reversing mechanism in response to rotational movement of said sprinkler body to an end limit of said predetermined arcuate rotational path.

14. The impact driver sprinkler of claim 13 wherein said first and second arms of said reversing mechanism each have cam follower means thereon, said sprinkler body having cam surface means formed thereon, said cam follower means being engageable with said cam surface means and biased by said first and second spring arms for releasably retaining said reversing mechanism respectively in the forward- and reverse-drive positions.

15. The impact drive sprinkler of claim 1 wherein said second spring arm applies a force to said reversing mechanism when in the reverse-drive position in a direction generally corresponding with the direction of impact forces applied by said drive arm to said reversing dog.

16. The impact drive sprinkler of claim 1 wherein said reversing mechanism includes means for snap-fit mounting onto said sprinkler body.

17. The impact drive sprinkler of claim 1 wherein said reversing mechanism further includes a limit arm cooperable with a limit track formed by said sprinkler body to limit said reversing mechanism to movement between said forward- and reverse-drive positions.

18. The impact drive sprinkler of claim 1 wherein said drive arm assembly mounting means comprises snap-fit mounting means.

19. The impact drive sprinkler of claim 1 wherein said drive arm assembly mounting means comprises a mounting post on said sprinkler body, a cylindrical bushing carrying said first spring means and rotatably receivable over said mounting post, and a generally cylindrical hub carried by said drive arm for press-fit reception of said bushing therein.

20. The impact drive sprinkler of claim 19 wherein said sprinkler body further includes a keeper post, said first spring means having a free end opposite said bushing for engagement with said keeper post.

21. The impact drive sprinkler of claim 20 wherein said hub on said drive arm has a longitudinally oriented keyway formed therein with one ramped margin, and wherein said bushing includes an external, longitudinally extending key receivable into said keyway when said hub is press-fit over said bushing, said ramped keyway margin urging said first spring means to partially wind up when said free end is engaged with said keeper post as said hub is pressed onto said bushing to apply a predetermined spring force to said drive arm urging said deflector spoon unit toward interrupting engagement with the projected water stream.

22. The impact drive sprinkler of claim 19 wherein said bushing and said first spring means are formed integrally with each other.

23. The impact drive sprinkler of claim 20 wherein said free end of said first spring means includes a resilient rate stepper finger disposed for engaging an angularly set tab formed on said drive arm when said drive arm swings to a predetermined maximum displacement away from interrupting engagement with the projected water stream, said rate stepper finger resiliently deflecting in response to engagement by said set tab to substantially increase the spring force resisting drive arm swinging movement away from the water stream.

24. The impact drive sprinkler of claim 20 wherein said first spring means comprises a spiral variable rate spring.

25. The impact drive sprinkler of claim 23 wherein said drive arm further includes a hood for overlying and protecting said hub and said first spring means, said set tab being formed on said hood.

26. The impact drive sprinkler of claim 1 further including a discharge nozzle mounted on said range tube at the downstream end of said water flow path.

27. The impact drive sprinkler of claim 1 further including means for variably diverting the water stream projected from said range tube, said diverting means including means movably responsive to water pressure for interrupting the projected water stream with a degree of interruption generally inversely proportional to the magnitude of water pressure.

28. The impact drive sprinkler of claim 1 further including a one-piece stream diverter including mounting means for removable mounting onto said sprinkler body, and a diverter blade, said diverter blade having a spring section joined at one end to said mounting means and defining a living spring-loaded hinge and a diverter section joined to the end of said spring section opposite said mounting means, said spring section urging said diverter section toward a normal position extending generally downstream and angularly into interrupting engagement with the water stream.

29. An impact drive sprinkler for connection to a water supply riser or the like, comprising:

a sprinkler body having a lower riser tube and an upper, outwardly directed range tube cooperatively defining a water flow path for receiving water from the water supply riser and for guiding the water through said sprinkler body for projection as a water stream outwardly from said range tube;

journal bearing means for mounting said sprinkler body onto the water supply riser for rotation with respect to the water supply riser and about a central axis of said riser tube;

impact drive means mounted on said sprinkler body for interrupting the water stream and for impact engagement with the sprinkler body to rotate said sprinkler body in a forward rotational direction in a succession of relatively small steps about said riser tube central axis;

a reversing mechanism mounted on said sprinkler body and including a reversing dog, said reversing mechanism being movable between a forward-drive position with said reversing dog out of the path of movement of said drive means and a reverse-drive position for impact engagement by said drive means to rotate said sprinkler body stepwise in a reverse rotational direction;

said reversing mechanism further including first and second cooperating spring arms for releasably retaining said reversing mechanism respectively in the forward- and reverse-drive positions, said first and second spring arms being movable respectively to stressed and unstressed conditions when said reversing mechanism is in the forward-drive position and respectively to unstressed and stressed conditions when said reversing mechanism is in the reverse-drive position, said spring arm in said stressed condition cooperating with said spring arm in said unstressed condition to retain said reversing mechanism respectively in said forward- and reverse-drive positions; and means for shifting said reversing mechanism between said forward- and reverse-drive positions in response to rotational movement of said sprinkler body to an end limit of a predetermined arcuate rotational path about said riser tube central axis.

30. The impact drive sprinkler of claim 29 wherein said sprinkler body has a unitary construction.

31. The impact drive sprinkler of claim 29 wherein one of said riser tube and said journal bearing sleeve includes a pair of relatively small annular bearing lands for rotatably supporting said riser tube with relatively small surface area within said sleeve.

32. The impact drive sprinkler of claim 29 wherein said impact drive means comprises an impact drive arm having a deflector spoon unit, means for mounting said drive arm for oscillating swinging movement of said deflector spoon unit into interrupting engagement with the water stream and impact engagement with said sprinkler body, and drive arm spring means for urging said drive arm to swing said deflector spoon unit toward interrupting engagement with the water stream and impact engagement with said sprinkler body whereby said impact drive means rotatably indexes said sprinkler body in a forward rotational direction in a succession of relatively small steps about said riser tube central axis.

33. The impact drive sprinkler of claim 29 further including a one-piece water stream diffuser and range deflector movably mounted on said sprinkler body for independent adjustment of droplet size and projected range of the water stream projected from said range tube.

34. The impact drive sprinkler of claim 29 wherein said reversing mechanism further includes a trip pin extending downwardly generally alongside said riser tube, said shifting means comprising a pair of friction rings carried by said journal bearing sleeve and each including at least one radially outwardly projecting wing for engaging said trip pin to shift the position of said reversing mechanism in response to rotational movement of said sprinkler body to an end limit of said predetermined arcuate rotational path.

35. The impact drive sprinkler of claim 34 wherein said reversing mechanism has a one-piece construction.

36. The impact drive sprinkler of claim 35 wherein said first and second spring arms each have a cam follower thereon engageable with said cam surface means on said sprinkler body, said cam followers on said first and second spring arms being respectively biased into engagement with said cam surface means when said reversing mechanism is in the forward- and reverse-drive positions.

37. The impact drive sprinkler of claim 36 wherein said second spring arm applies a force to said reversing mechanism when in the reverse-drive position in a direction generally corresponding with the direction of impact forces applied by said impact drive means to said reversing dog.

38. The impact drive sprinkler of claim 29 wherein said reversing mechanism includes means for snap-fit mounting onto said sprinkler body.

39. The impact drive sprinkler of claim 29 wherein said reversing mechanism further includes a limit arm cooperable with a limit track formed by said sprinkler body to limit said reversing mechanism to movement between said forward- and reverse-drive positions.

40. The impact drive sprinkler of claim 29 wherein said sprinkler body includes a mounting post, said reversing mechanism having a generally cylindrical mounting boss for rotatable reception over said mounting boss, and further including means for retaining said mounting boss on said mounting post.

41. The impact drive sprinkler of claim 40 wherein said retaining means comprises snap-fit means cooperable between said mounting post and said mounting boss.

42. The impact drive sprinkler of claim 41 wherein said snap-fit means comprises a pair of axially spaced and relatively small surface area lands on said mounting post for rotatably supporting said mounting boss, and a snap rib within said mounting boss for snap-fit reception past one of said lands when said mounting boss is pressed onto said mounting post.

43. The impact drive sprinkler of claim 28 further including a one-piece stream diverter including diverter means for variably interrupting the projected water stream and spring means for urging said diverter means toward interrupting engagement with the water stream.

44. An impact drive sprinkler for connection to a water supply riser or the like, comprising:

a sprinkler body having a lower riser tube and an upper, outwardly directed range tube cooperatively defining a water flow path for receiving water from the water supply riser and for guiding the water through said sprinkler body for projection as a water stream outwardly from said range tube;

journal bearing means for mounting said sprinkler body onto the water supply riser for rotation with respect to the water supply riser and about a central axis of said riser tube;

an impact drive arm having a deflector spoon unit at one end thereof; and spring means including central bushing means for rotatable reception over a mounting post on said sprinkler body, said spring means having a free end opposite said central bushing means for engagement with keeper means on said sprinkler body;

said drive arm further including mounting means non-rotationally engageable with said central bushing means for displacing said spring means toward a partially stressed condition when said free end is engaged with said keeper means and said bushing means is received about said mounting post, whereby said spring means applies a spring force to said drive arm for urging said drive arm to rotate about said mounting post to swing said deflector spoon unit toward interrupting engagement with the water stream and impact engagement with said sprinkler body to rotatably index said sprinkler body in a forward rotational direction in a succession of relatively small steps about said riser tube central axis.

45. The impact drive sprinkler of claim 44 wherein said mounting post projects upwardly from said sprinkler body generally perpendicular to said range tube.

46. The impact drive sprinkler of claim 45 wherein said spring means comprises a variable rate spring.

47. The impact drive sprinkler of claim 46 wherein said variable rate spring comprises a spiral spring having spiral coils of generally uniform size and a radial intercoil spacing increasing progressively from said bushing means to said free end.

48. The impact drive sprinkler of claim 44 further including a one-piece water stream diffuser and range deflector movably mounted on said sprinkler body for independent adjustment of droplet size and projected range of the water stream projected from said range tube.

49. The impact drive sprinkler of claim 44 further including reversing means controllably engageable with said drive arm for impact thereby to rotatably drive said sprinkler body stepwise in a reverse rotational direction within the limits of a predetermined arcuate path about said riser tube central axis.

50. The impact drive sprinkler of claim 49 wherein said reversing mechanism has a one-piece construction and includes reverse spring means for releasably retaining said reversing mechanism in a forward-drive position out of the swinging path of said drive arm and a reverse-drive position for impact engagement of said reversing mechanism by said drive arm.

51. The impact drive sprinkler of claim 44 wherein said drive arm mounting means comprises a generally cylindrical hub on said drive arm for press-fit reception of said central bushing means.

52. The impact drive sprinkler of claim 51 wherein said hub has a keyway formed therein with at least one ramped margin, said central bushing means including a key receivable into said keyway when said hub is press-fit thereon to rotate said central bushing means relatively to said hub to partially wind up said spring means when said free end is engaged with said keeper means whereby said spring means applies a predetermined biasing force to said drive arm to rotate said drive arm about said mounting post.

53. The impact drive sprinkler of claim 44 wherein said spring means includes a resilient rate stepper finger disposed for engaging an angularly set tab formed on said drive arm when said drive arm swings to a predetermined maximum displacement away from interrupting engagement with the projected water stream, said rate stepper finger resiliently deflecting in response to engagement by said set tab to substantially increase the spring force resisting drive arm swinging movement away from the water stream.

54. The impact drive sprinkler of claim 53 wherein said drive arm further includes a hood for overlying and protecting said hub and said spring means, said tab being formed on said hood.

55. The impact drive sprinkler of claim 44 wherein said mounting post and said central bushing means include snap-fit means for retaining said bushing means rotatably on said mounting post.

56. An impact drive sprinkler for connection to a water supply riser or the like, comprising:

a sprinkler body having a lower riser tube and an upper, outwardly directed range tube cooperatively defining a water flow path for receiving water from the water supply riser and for guiding the water through said sprinkler body for projection as a water stream outwardly from said range tube;

journal bearing means for mounting said sprinkler body onto the water supply riser for rotation with respect to the water supply riser and about a central axis of said riser tube;

a mounting post extending generally vertically from said sprinkler body, said mounting post having thereon a pair of bearing lands of relatively small surface area;

a drive arm having a deflector spoon unit at one end thereof, said drive arm further including a generally cylindrical hub with a longitudinally oriented keyway formed therein with at least one ramped side margin; and spring means including a central bushing for rotatable reception over said mounting post, said bushing including an inner snap rib for snap-fit reception past one of said bearing lands, said spring means further including a spring having one end joined to said bushing and an outer free end engageable with keeper means on said sprinkler body, said bushing having an external key receivable into said keyway;

said hub being press-fit over said bushing with said key receivable into said keyway while said bushing is disposed about said mounting post with said outer free end of said spring means engaged with said keeper means, said key riding along said ramped keyway side margin to rotate said bushing in a direction stressing said spring means for applying a spring preload to said drive arm for urging said drive arm to swing said deflector spoon unit toward interrupting engagement with the projected water stream and impact engagement with said sprinkler body to rotate said spring body in a forward direction about said riser tube central axis.

57. The impact drive sprinkler of claim 56 includes a resilient rate stepper finger disposed for engaging an angularly set tab formed on said drive arm when said drive arm swings to a predetermined maximum displacement away from interrupting engagement with the projected water stream, said rate stepper finger resiliently deflecting in response to engagement by said set tab to substantially increase the spring force resisting drive arm swinging movement away from the water stream.

58. The impact drive sprinkler of claim 57 wherein said drive arm further includes a hood for overlying said protecting said hub and said spring means, said tab being formed on said hood.

59. The impact drive sprinkler of claim 56 wherein said spring comprises a variable rate spiral spring.

60. An impact drive sprinkler for connection to a water supply riser or the like, comprising:

a sprinkler body having a lower riser tube and an upper, outwardly directed range tube cooperatively defining a water flow path for receiving water from the water supply riser and for guiding the water through said sprinkler body for projection as a water stream outwardly from said range tube;

journal bearing means for mounting said sprinkler body onto the water supply riser for rotation with respect to the water supply riser and about a central axis of said riser tube;

impact drive means mounted on said sprinkler body for interrupting the water stream and for impact engagement with the sprinkler body to drive said sprinkler body in a forward rotational direction in a succession of relatively small steps about said riser tube central axis; and a one-piece water stream diffuser and range deflector movably mounted on said sprinkler body for independent adjustment of droplet size and projected range of the water stream projected from said range tube.

61. The impact drive sprinkler of claim 60 wherein said sprinkler body includes a laterally projecting mounting cylinder positioned generally at one side of said range tube and having laterally oriented external ratchet teeth, said water stream diffuser and range deflector comprising a ratchet sleeve receivable over said mounting cylinder and having internal ratchet teeth matingly engageable with the teeth on said mounting cylinder, said ratchet sleeve carrying a diffuser pin extending generally through a central bore of said mounting cylinder and terminating in a diffusion tip, said ratchet sleeve further carrying a support arm extending generally perpendicular to said diffuser pin and joined to a deflector plate extending laterally toward the water stream;

said ratchet sleeve being movable on said mounting cylinder generally parallel to said diffuser pin to displace said diffusion tip between a first position substantially interrupting the water stream and a second position substantially avoiding water stream interruption;

said ratchet sleeve being rotatable about said mounting cylinder to move said deflector plate between a first position angularly deflecting the water stream and a second position substantially avoiding water stream deflection, said interengaged ratchet teeth on said mounting cylinder and ratchet sleeve releasably retaining said ratchet sleeve in a desired rotational position about said mounting cylinder.

62. The impact drive sprinkler of claim 61 including means for limiting the range of permitted rotation between said ratchet sleeve and said mounting cylinder.

63. The impact drive sprinkler of claim 62 wherein said rotation limiting means comprises a notch formed in the circumference of said ratchet sleeve and a rib member on said sprinkler body receivable into said notch when said ratchet sleeve is received over said mounting cylinder.

64. The impact drive sprinkler of claim 61 wherein said water stream diffuser and range deflector includes means for snap-fit mounting onto said sprinkler body.

65. The impact drive sprinkler of claim 64 wherein said snap-fit mounting means comprises a snap tab on said diffuser pin for snap-fit reception through the central bore of said mounting cylinder, said snap tab being movable with said diffusion tip between the first and second positions of said diffusion tip.

66. The impact drive sprinkler of claim 60 further including a one-piece reversing mechanism mounted on said sprinkler body and including a reversing dog, said reversing mechanism being movable between a forward-drive position with said reversing dog out of the path of movement of said drive means and a reverse-drive position for impact engagement by said drive means to rotate said sprinkler body stepwise in a reverse rotational direction.

67. The impact drive sprinkler of claim 60 wherein said impact drive means comprises an impact drive arm having a deflector spoon unit, means for mounting said drive arm for oscillating swinging movement of said deflector spoon unit into interrupting engagement with the water stream and impact engagement with said sprinkler body, and drive arm spring means for urging said drive arm to swing said deflector spoon unit toward interrupting engagement with the water stream and impact engagement with said sprinkler body whereby said impact drive means rotatably indexes said sprinkler body in a forward rotational direction in a succession of relatively small steps about said riser tube central axis.

68. An impact drive sprinkler for connection to a water supply riser or the like, comprising:

a sprinkler body having a lower riser tube and an upper, outwardly directed range tube cooperatively defining a water flow path for receiving water from the water supply riser and for guiding the water through said sprinkler body for projection as a water stream outwardly from said range tube;

journal bearing means for mounting said sprinkler body onto the water supply riser for rotation with respect to the water supply riser and about a central axis of said riser tube;

impact drive means mounted on said sprinkler body for interrupting the water stream and for impact engagement with the sprinkler body to drive said sprinkler body in a forward rotational direction in a succession of relatively small steps about said riser tube central axis;

a mounting post on said sprinkler body;

a one piece reversing mechanism including a generally cylindrical mounting boss rotatably receivable onto said mounting post, a rocker arm projecting in one direction from said mounting boss and carrying a reversing dog at the distal end thereof, a limit arm projecting into a track on said sprinkler body to limit said reversing mechanism to rotate about said mounting post between a forward-drive position and a reverse-drive position, a trip pin, and at least one spring arm including cam follower mean engageable with cam surface means on said sprinkler body for releasably retaining said reversing mechanism respectively in the forward- and reverse-drive positions; and means for shifting said reversing mechanism between said forward- and reverse-drive positions in response to rotational movement of said sprinkler body to an end limit of a predetermined arcuate rotational path about said riser tube central axis;

said reversing dog being disposed out of engagement with said drive means in said forward-drive position and being disposed for impact engagement by said drive means in said reverse-drive position for rotatably driving said sprinkler body stepwise in a reverse rotational direction.

69. The impact drive sprinkler of claim 68 wherein said at least one spring arm comprises first and second spring arms each having a cam follower thereon engageable with said cam surface means, said cam followers on said first and second spring arms being respectively biased into engagement with said cam surface means when said reversing mechanism is in the forward and reverse-drive positions.

70. An impact drive sprinkler for connection to a water supply riser or the like, comprising:

a unitary sprinkler body having a lower riser tube joined at the upper end to an outwardly, forwardly directed range tube, said riser tube and said range tube cooperating to define a continuous water flow path for receiving water from the water supply riser and for guiding the water through said sprinkler body for outward projection as a water stream;

said sprinkler body further including a radially enlarged platform generally at the upper end of said riser tube, a support plate generally at the upper end of said riser tube, a first mounting post projecting upwardly from and generally perpendicular to said range tube, a keeper post projecting upwardly from said range tube and spaced from said first mounting post, and a second mounting post projecting from said support plate generally away from said riser tube, said riser tube having an outer annular groove therein near the lower end thereof;

a one-piece journal bearing sleeve rotatably receivable about said riser tube generally between said platform and said groove, said journal bearing sleeve including means for connection to the water supply riser and rotatably supporting said sprinkler body for rotation about a central axis of said riser tube;

a seal washer receivable in said groove to axially retain said journal bearing sleeve between said platform and said seal washer;

a drive arm spring including a central bushing for rotatable reception about said first mounting post, means for retaining said bushing about said first mounting post, a spring having one end connected to said bushing and an outer free end for interlocking with said keeper post when said bushing is received about said first mounting post;

a drive arm including a deflector spoon unit at one end thereof, and hub means for non-rotational interconnection with said central bushing, said hub means and said bushing including interengageable preload means for stressing said spring as said hub means is interconnected with said bushing while said bushing is received about said first mounting post and said spring free end is interlocked with said keeper post, said spring when stressed applying a biasing force through said bushing to said drive arm to urge said drive arm to swing said deflector spoon unit into interrupting engagement with the water stream and into impact engagement with said sprinkler body to rotate said sprinkler body in steps in a forward direction about said riser tube central axis;

a one-piece reversing mechanism including a mounting boss rotatably received about said second mounting post, means for retaining said mounting boss on said second mounting post, a rocker arm projecting radially from said mounting boss and carrying a reversing dog, a limit arm projecting into a track defined by said support plate to limit rotation of the reversing mechanism about said second mounting post to movement between a forward-drive position and a reverse-drive position, a trip pin, and at least one spring arm including cam follower means engageable with cam surface means on said support plate for releasably retaining said reversing mechanism respectively in the forward- and reverse-drive positions; and at least one friction ring carried about said journal bearing sleeve and including means for engaging said trip pin to shift said reversing mechanism between the forward- and reversed-drive positions at the end limits of a predetermined part-circular path of sprinkler body rotation about said riser tube central axis;

said reversing dog being disposed out of engagement with said drive arm in said forward-drive position and being disposed for impact engagement by said drive arm in said reverse-drive position for rotatably driving said sprinkler body stepwise in a reverse rotational direction.

71. The impact drive sprinkler of claim 70 further including a one-piece water stream diffuser and range deflector movably mounted on said sprinkler body for independent adjustment of droplet size and projected range of the water stream projected from said range tube.

72. The impact drive sprinkler of claim 70 wherein said sprinkler body, said journal bearing sleeve and said reversing mechanism are formed from molded plastic.

73. The impact drive sprinkler of claim 70 wherein said friction ring has internal ratchet teeth for engagement with external ratchet teeth formed on said journal bearing sleeve.

74. The impact drive sprinkler of claim 70 further including a one-piece stream diverter including diverter means for variably interrupting the projected water stream and spring means for urging said diverter means toward interrupting engagement with the water stream.

75. An impact drive sprinkler for connection to a water supply riser or the like, comprising:

a sprinkler body having a lower riser tube and an upper, outwardly directed range tube cooperatively defining a water flow path for receiving water from the water supply riser and for guiding the water through said sprinkler body for projection as a pressurized water stream outwardly from said range tube;

journal bearing means for mounting said sprinkler body onto the water supply riser for rotation with respect to the water supply riser and about a central axis of said riser tube;

impact drive means mounted on said sprinkler body for interrupting the water stream and for impact engagement with the sprinkler body to drive said sprinkler body in a forward rotational direction in a succession of relatively small steps about said riser tube central axis; and a one piece molded plastic stream diverter comprising a generally C-shaped clamp portion for reception about said range tube and having means for preventing rotation of said clamp portion about said range tube, an elongated, generally rectangular cross-section spring arm portion projecting forwardly from said clamp portion, said spring arm portion having a section of reduced cross-sectional thickness adjacent said clamp portion forming an integral living spring hinge, and a diverter portion projecting forwardly from said spring arm portion downstream of said range tube and disposed below said range tube, said spring hinge urging said diverter portion upwardly toward interrupting engagement with said water stream and permitting downward movement of said diverter portion away from said stream in response to increased water stream pressure.

76. The impact drive sprinkler of claim 75 wherein said diverter arm further includes upstanding side walls generally along the longitudinal margins thereof.

* * * * *